(12) United States Patent
Schek (10) Patent No.: US 7,802,027 B2
(45) Date of Patent: Sep. 21, 2010

(54) METHOD FOR DATA PROCESSING IN A SCAN MICROSCOPE COMPRISING A FAST SCANNER AND SCAN MICROSCOPE COMPRISING A FAST SCANNER

(75) Inventor: Stefan Schek, Neckargmünd (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 1278 days.

(21) Appl. No.: 10/501,686

(22) PCT Filed: Jan. 25, 2003

(86) PCT No.: PCT/EP03/00768

§ 371 (c)(1),
(2), (4) Date: Dec. 29, 2005

(87) PCT Pub. No.: WO03/067891

PCT Pub. Date: Aug. 14, 2003

(65) Prior Publication Data

US 2006/0102841 A1    May 18, 2006

(30) Foreign Application Priority Data

Feb. 2, 2002    (DE)    ................................. 102 04 369

(51) Int. Cl.
*G06F 13/00*    (2006.01)
(52) U.S. Cl. ................................. 710/35; 710/2; 710/33
(58) Field of Classification Search ........................ None
See application file for complete search history.

(56) References Cited

U.S. PATENT DOCUMENTS

| | | | |
|---|---|---|---|
| 4,318,137 A * | 3/1982 | Cordova et al. | ................ 360/32 |
| 5,469,398 A * | 11/1995 | Scott et al. | ................... 365/221 |
| 2006/0057497 A1 * | 3/2006 | Fourkas et al. | ......... 430/270.15 |

FOREIGN PATENT DOCUMENTS

| | | |
|---|---|---|
| DE | 101 34 328 | 1/2003 |
| EP | 1 120 675 A2 | 8/2001 |

OTHER PUBLICATIONS

Sato, et al., "Compressed Video Transmission Protocol Considering Dynamic QoS Control", 1998 IEEE, pp. 95-104.
Ramanujan, et al., "Adaptive Streaming of MPEG Video over IP Networks", 1997, IEEE, pp. 398-409.
Sata, et al., "Confocal Laser Scanning Microscope," Optics and Laser Technology, Elsevier Science Publishers BV, Apr. 1997.

* cited by examiner

*Primary Examiner*—Eron J Sorrell
(74) *Attorney, Agent, or Firm*—Houston Eliseeva LLP (57) ABSTRACT

The process acquires data blocks in real-time with a fast scanner. The acquired data blocks are then transmitted to a computer system (23). The data blocks are then processed as a function of a frame burst ratio (N). The transmission of the acquired data blocks to the computer system is a function of the frame burst ratio (N). The frame burst ratio (N) may be either fixed or variable. In any case, optimal utilization of the computer system's (23) performance is important. The frame burst ratio (N) is selected by the user or by the computer system (23) itself as a function of the processing characteristics of the computer system (23).

10 Claims, 9 Drawing Sheets

METHOD FOR DATA PROCESSING IN A SCAN MICROSCOPE COMPRISING A FAST SCANNER AND SCAN MICROSCOPE COMPRISING A FAST SCANNER

The invention concerns a data processing method in a scanning microscope with a fast scanner.

Furthermore, the invention concerns a scanning microscope with a fast scanner. In particular, the invention concerns a scanning microscope with a fast scanner, consisting of a scanning module, a position sensor, and at least one detector; with a computer system with at least one peripheral attached the computer system and one input device. A method for setting the image recording of a microscope is disclosed in the not yet published patent application DE 101 34 328.0. Image data is transmitted from an image recording element to a storage element. Control parameters are given to a coder. Coding takes place before the transmission of image data from the storage element to the computer. The coded and transmitted image data are processed by the computer. The invention has the disadvantage that a portion of the image data and the information contained in it are lost as a result of coding. These data are permanently lost and unavailable for analysis.

The problem of the invention is to create a method that makes possible data processing of all data acquired by a fast scanner, without delays occurring during processing.

The objective problem is solved by a method having the features contained in the characterizing portion of patent claim 1.

A further problem of the invention is to create a scanning microscope with which all acquired data is processed, without having potential delays caused by the computer system, which limit the processing of all data.

The invention has the advantage that with the method, data blocks are acquired with a fast scanner. The acquired data blocks are then transmitted to a computer system. The processing of the data blocks is a function of the frame burst ratio. In addition, the transmission of acquired data blocks to the computer system may also be a function of a frame burst ratio. The frame burst ratio must be specified in such a way that the computer system's performance is optimally utilized. The frame burst ratio is selected by the user, depending on the processing characteristics of the computer system and remains constant during acquisition of the data blocks.

A further advantageous development of the invention is that an adaptive control is envisioned that allows for a variable frame burst ratio. The computer system then adapts the frame burst ratio to the current working conditions in the computer system, or to the parameter settings of the scanning microscope. When data acquisition begins, the user may enter an initial value for the frame burst ratio. The computer system may also select an initial value, and adapt it as needed.

The frame burst ratio determines the frequency of the transmitted data blocks or of the on/off ratio, respectively. The computer system adapts to the performance requirements of the moment by means of the frame burst ratio. All data blocks are first stored in the computer system, and only the data blocks specified by the variable frame burst ratio will be processed. It is also of advantage that only those data blocks that correspond to the fixed frame burst ratio specified by the user are transmitted to and processed by the computer system. The data blocks that have not yet been transmitted are delayed and then transmitted to the computer system for processing.

Further advantageous developments of the invention may be inferred from the subordinate claims.

The subject of the invention is schematically shown in the diagram and is described on the basis of the following figures. They show.

Figure 1:
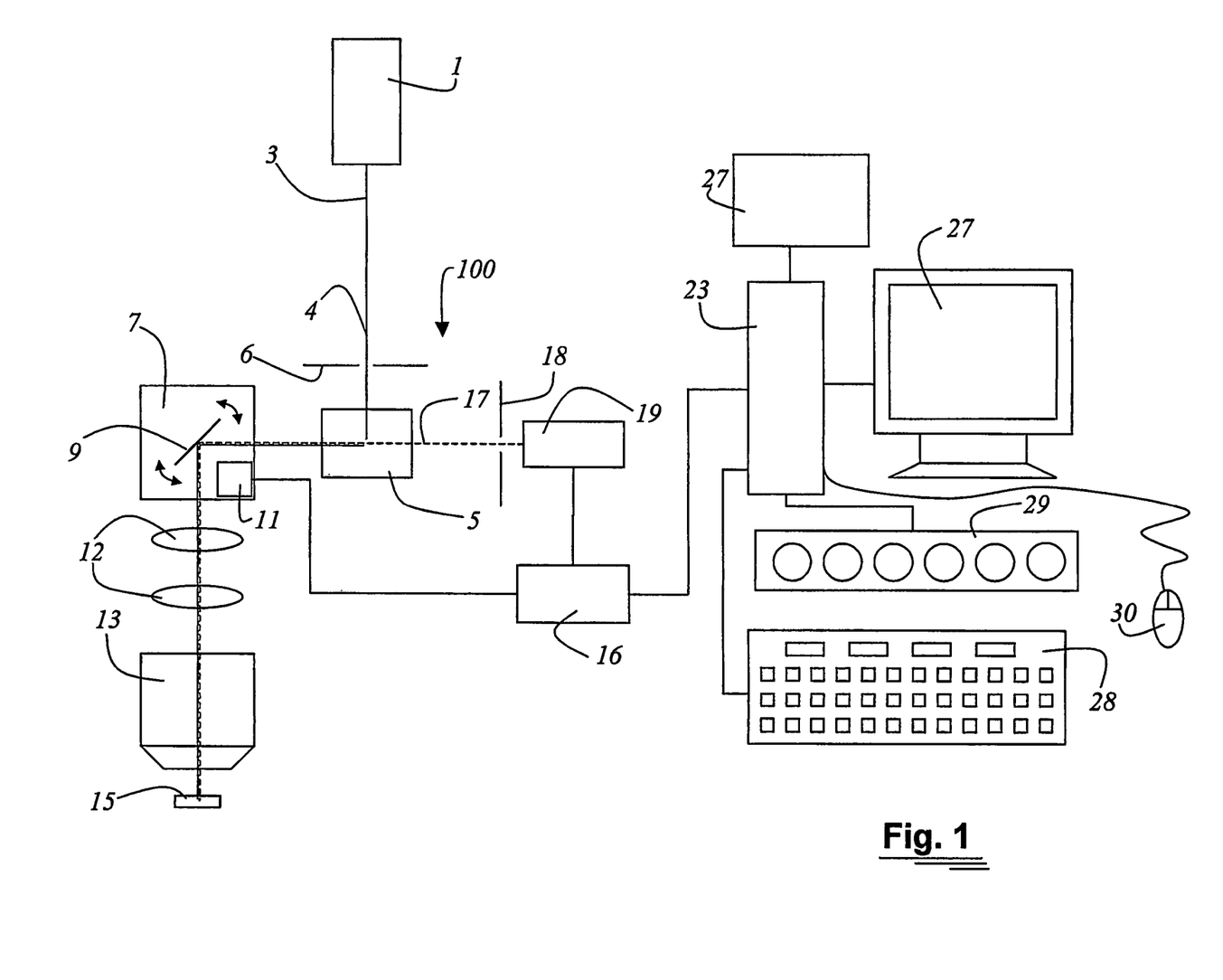
FIG. 1 a schematic diagram of a scanning microscope with a fast scanner.

FIG. 1 is a schematic diagram of an embodiment of the invention in the form of a confocal scanning microscope (100). However, this should not the viewed as a limitation of the invention. It will be more than clear to the person skilled in the art that the invention may also be realized with a conventional microscope or conventional scanning microscope. The illumination light beam (3) coming from at least one illumination system (1) is reflected by a beam splitter or a suitable reflecting material (5) to a scanning module (7). Before the illumination light beam (3) hits the reflecting material (5) it passes through an illumination pinhole (6). The scanning module (7) comprises a cardanically suspended scanning mirror (9), which sends the illumination light beam (3) through a scanner lens (12) and a microscope lens (13) over or through an object (15). When it encounters non-transparent objects (15), the illumination light beam (3) is sent over the surface of the object. With biological objects (15) such as samples or transparent objects, the illumination light beam (3) can also be sent through the object (15). To this end, nonluminous samples can be prepared with a suitable dye (not shown because it is established state of the art). This means that different focal planes of the object can be successively scanned by the illumination light beam (3). A position sensor (11) that determines the positional data of the acquired image data is connected with the scanning module (7). Subsequent combination of the positional data and the image data yields a 2-dimensional or 3-dimensional frame (or image) of the object (15). The illumination light beam (3) coming from the illumination system (1) is depicted as a solid line. The light coming from the object (15) defines a detection light beam (17). This beam reaches the reflecting material (5) through the microscope lens (13) or the scanner lens (12) via the scanning module (7), passes through it, and by way of a detection pinhole (18) reaches at least one detector (19), which is here embodied as a photo multiplier. The person skilled in the art will understand that other detection components, such as diodes, diode arrays, CCD chips, or CMOS image sensors can also be used. The detection beam (17) that comes from and is defined by the object (15), respectively, is depicted in FIG. 1 as a broken line. Electrical detection signals, which are proportional to the light coming from the object, are generated in the detector (19). The scanning module (7), the positional sensor (11), and at least one detector (19) together comprise a fast scanner (14). A local storage unit (16), which receives the data from at least one detector (19) and the positional sensor (11), is allocated to the fast scanner (14). The data is transferred in suitable form from the local storage unit (16) to a computer system (23). It will be self-evident to a person skilled in the art—that the position of the scanning mirror (9) can also be determined by the positioning signals. The computer system (23) is designed with at least one peripheral device (27). The peripheral device can, for example, be a display that gives the user the information needed to adjust the microscope system, or from which he may receive the current setup as well as the image data in graphic form. Furthermore, the computer system (23) has at least one input device such as a keyboard (28), an adjusting device (29) for the components of the microscope system, and a mouse (30). Processing of the data blocks takes place in at least one peripheral device (27). Processing may be understood as printing, the compression of data, display on a computer screen, on line analysis, or storage in the storage units.

Figure 2:
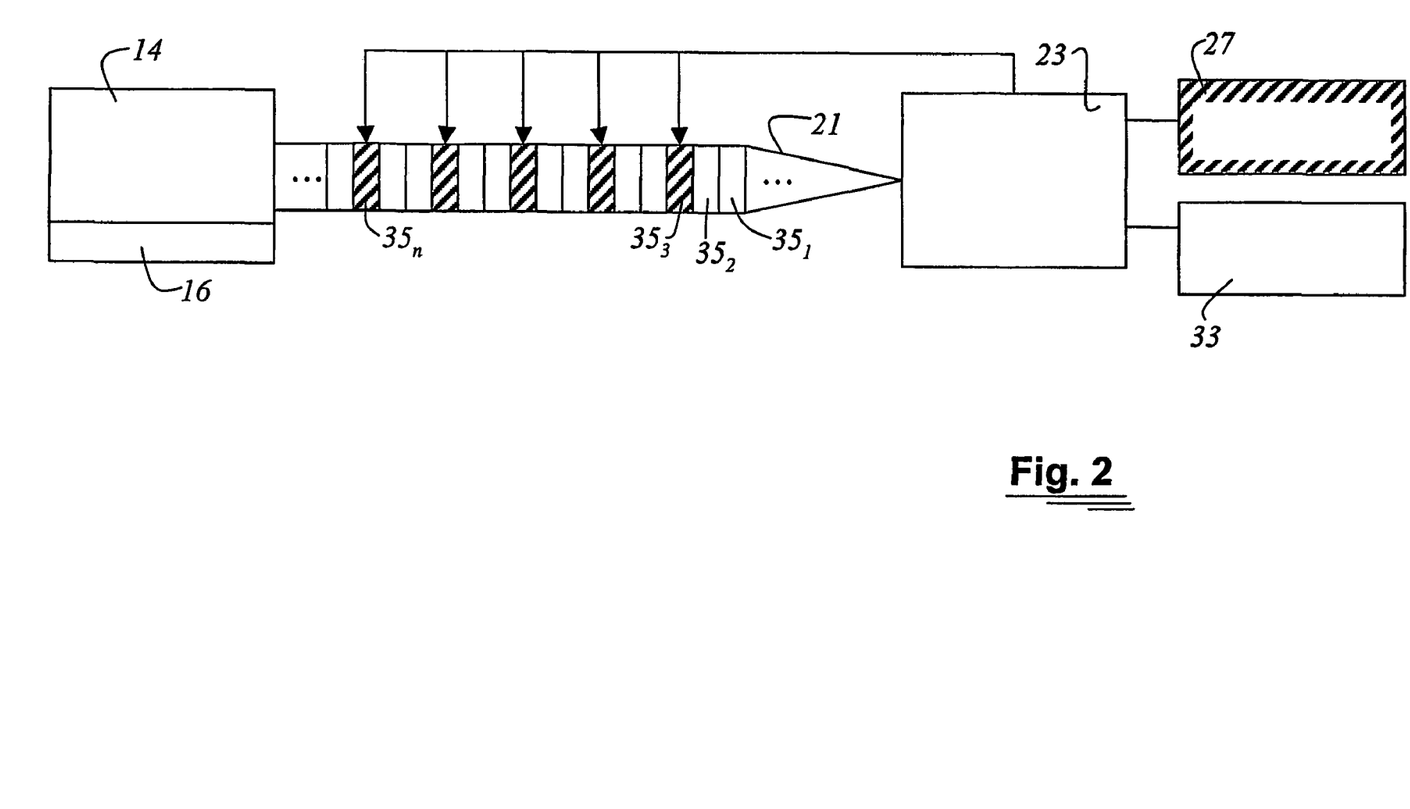
FIG. 2 a schematic diagram of the transmission of data from a real-time system to a non-real-time system, in which case the frequency of the processed data blocks is preselected.

FIG. 2 presents an embodiment of the method, the so-called frame burst ratio, in which only a certain number of data blocks are transmitted. The viewing of a frame all at once ("frame burst") and not "block by block" has been known for some time. However, this technique is not sufficient because in fast scanners, the processing of acquired data in a computer system cannot keep up with the acquisition of the data itself. A local storage unit (16) is allocated to the fast scanner which, as previously mentioned, consists of the scanning module (7), the position sensor (11), and at least one detector (19). The fast scanner transmits the data in real time to its own local storage unit (16) and simultaneously to the computer system (23) as well. All data blocks (frames $35_1$, $35_2$, ..., $35_n$) are stored in the computer system (23). However, only those data blocks that are specified by the frame burst ratio (N) are processed in a peripheral device (27). For example, a frame burst of N=10 means that only every tenth data block is processed. The frequency of the data blocks that are processed in the computer system (23) is constant. In the example depicted in FIG. 2, the frame burst ratio is N=3 so that every third data block undergoes processing in the computer system (23). These data blocks (frames) are depicted with crosshatches in FIG. 2. It is possible for the user to specify whatever frame burst ratio (N) (or frequency) he wishes so that it takes into account the individual imaging characteristics of his computer system (23). The user inputs the frame burst ratio (N) by means of a keyboard (28), a mouse (30), or an adjusting device (28).

Figure 3:
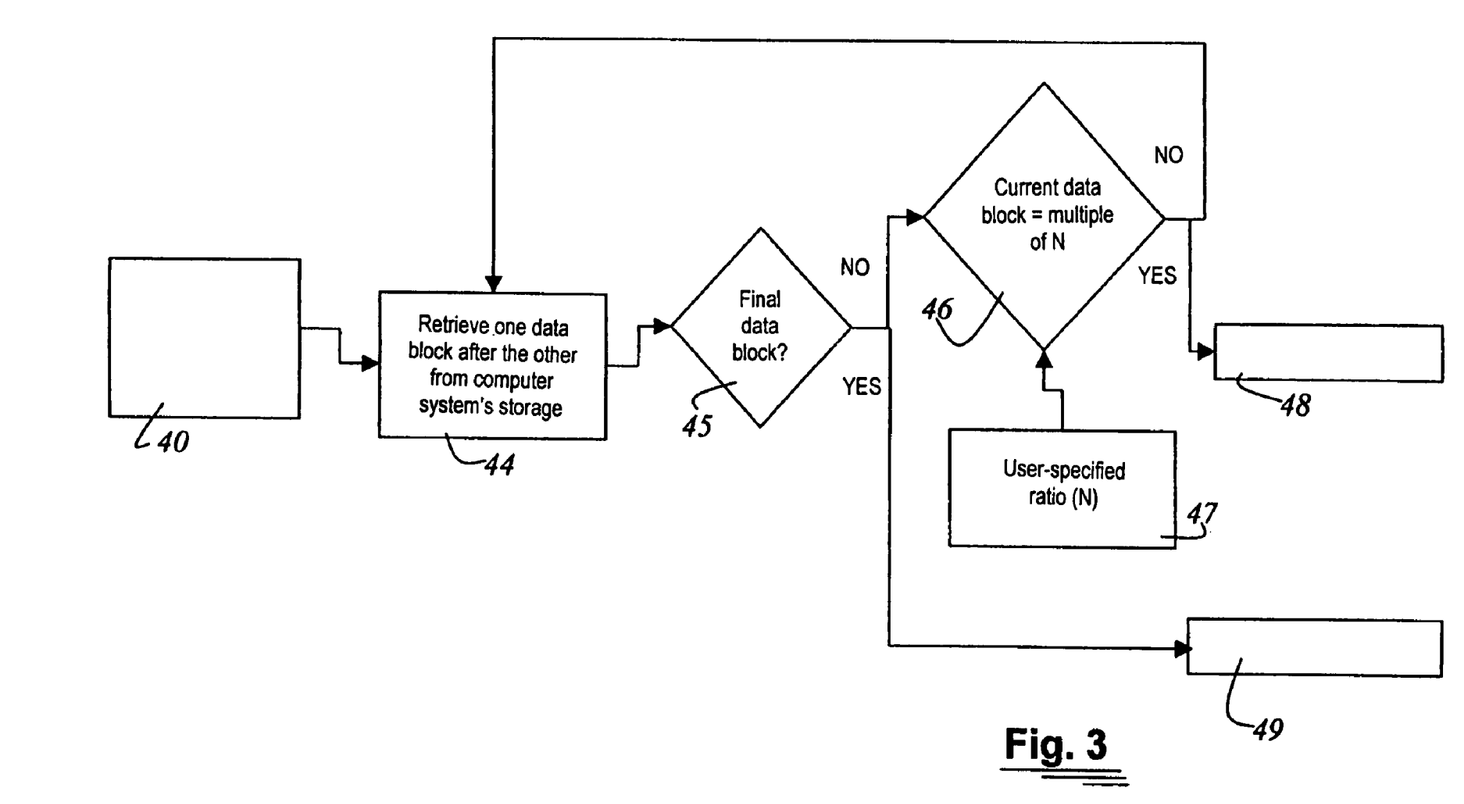
FIG. 3 a block diagram of a first embodiment of the invention, as schematically shown in FIG. 2.

FIG. 3 is a block diagram that depicts the first embodiment of the method according to the invention. In a first step (40), the data blocks (frames $35_1$, $35_2$, ..., $35_n$) acquired by the fast scanner are transmitted to an internal storage unit in the computer system (23). Subsequently, in a second step (44), the computer system (23) retrieves data blocks in accordance with the frame burst ratio (N)—for example, every tenth data block—from the storage unit in computer system (23). A first decision module (45) tests whether this was the final data block. If the result in this decision module (45) is NO, the process is continued in a second decision module (46). Here, the current data block is tested to determine whether it is a multiple of N. If YES, the data block is processed or displayed. If the result in the second decision module (46) was NO, the process loops back, the second step (44) is redone, and a corresponding data block is retrieved from the storage unit of the computer system. If the result was YES in the first decision module (45), the rest of the data blocks are retrieved from the storage unit in the computer system and are transmitted for processing and/or display of the other data blocks (49). The user can himself specify the frame burst ratio (N) by means of an input device (47). This then acts on the second decision module (46). Depending on the workload of the computer system (23) the user can decide whether or not to change the frame burst ratio (N).

Figure 4:
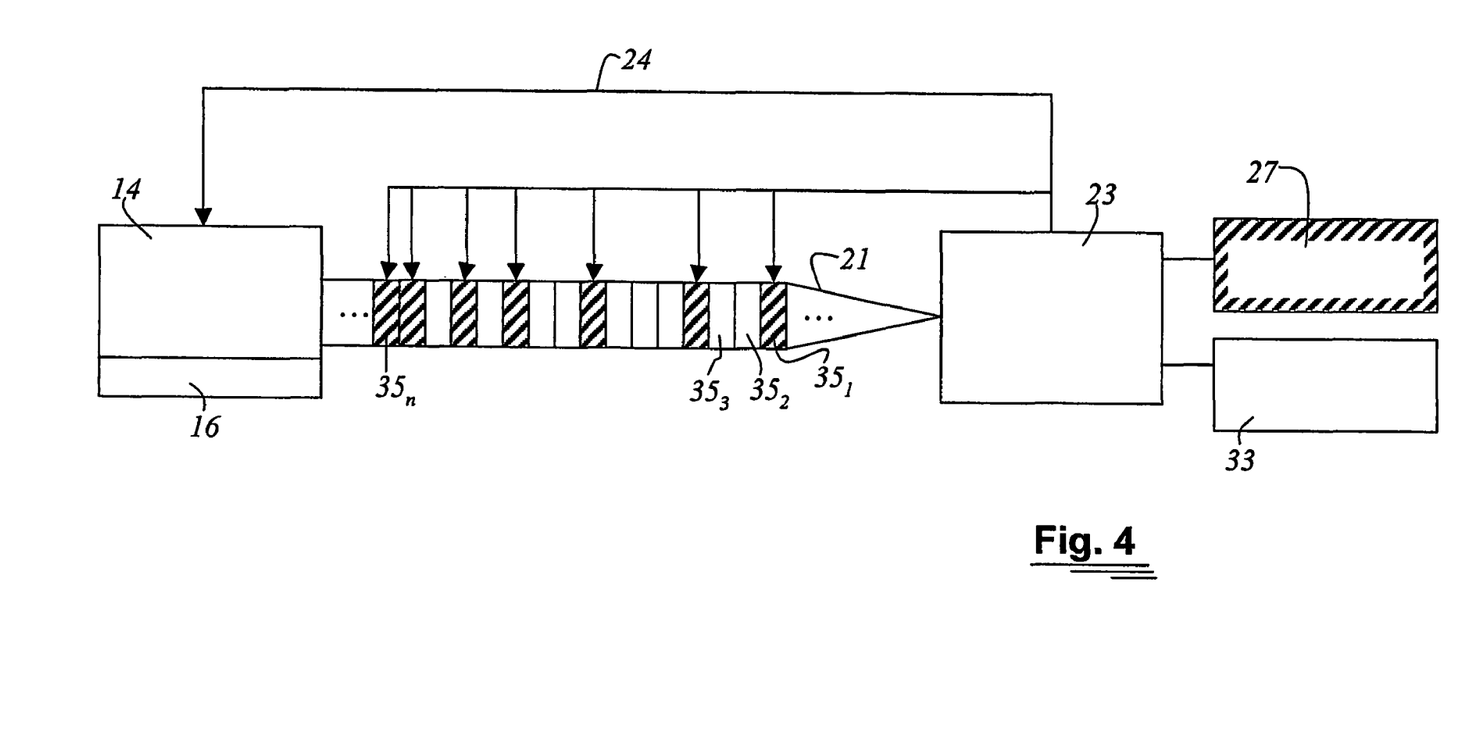
FIG. 4 a schematic diagram of the transmission of data from a real-time system to a non-real-time system, in which case the frequency of the processed data blocks may be adapted to the performance of the computer system.

FIG. 4 depicts another embodiment of a method in which only a certain number of data blocks are processed. As already mentioned in FIG. 2, a local storage unit (16) is allocated to the fast scanner (14). The fast scanner transmits the data in real time over a dedicated transmission line (21) to its own local storage unit (16) and simultaneously to the computer system (23) as well. All data blocks (frames $35_1$, $35_2$, ..., $35_n$) are stored in the computer system (23). However, only those data blocks that are specified by the frame burst ratio (N) are processed. An adaptive control is envisioned that makes the frame burst ratio (N) variable. This means that the frequency of the processed data blocks or of the on/off ratio, respectively, change and adapt to the current performance of the computer system (23). To this end, a feedback system (24) is envisioned between the fast scanner and the computer system (23) to monitor the delay or acceleration through the computer system (23) in comparison to the fast scanner, and to readjust the frequency of the processed data blocks as well.

Figure 5:
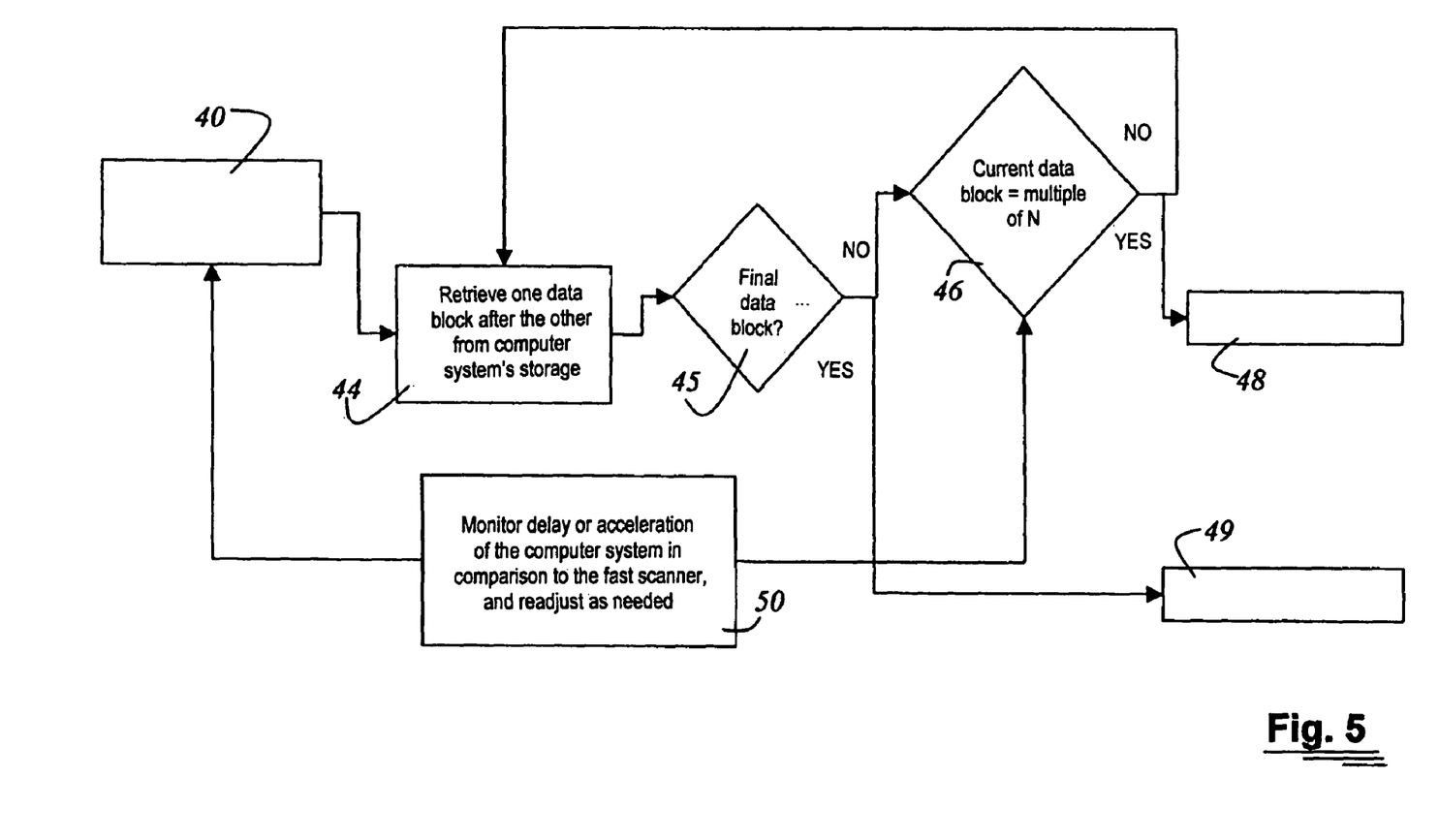
FIG. 5 a block diagram of a second embodiment of the invention, as schematically shown in FIG. 4.

FIG. 5 is a block diagram that depicts the second embodiment of the method according to the invention. According to the method depicted in FIG. 3, the user of the confocal scanning microscope (100) must determine the setting of the frame-burst ratio experimentally and set it accordingly. The processing characteristics of the confocal scanning microscope (100) are determined by a variety of peripheral conditions and is not deterministic. They may change over time and lead to deceleration or acceleration of processing as the number of frames increases. For this reason it is essential to be able to readjust the frame burst ratio adaptively for optimal display or processing of the scan data. Here, processing by the computer system (23) is continually monitored during data acquisition. Any potential delay or acceleration is then countered by an increase or decrease in the frame burst ratio. Similar to the process depicted in FIG. 3, the data blocks (frames $35_1$, $35_2$, ..., $35_n$) acquired by the fast scanner are transmitted to an internal storage unit in the computer system (23) in a first step (40). Subsequently, the computer system (23) retrieves the frames or data blocks, respectively, from the storage unit in the computer system (23) in a second step (44) in accordance with an initial frame burst ratio (N), such as every tenth data block. A first decision module (45) tests whether this was the final data block. If the result in this decision module (45) is NO, the process is continued in a second decision module (46). Here, the current data block is tested to determine whether it is a multiple of N. If YES, the data block is processed (48). If the result in the second decision module (46) was NO, the process loops back, the second step (44) is redone, and a corresponding data block is retrieved from the storage unit in the computer system. If the result was YES in the first decision module (45), the rest of the data blocks are retrieved from the storage unit of the computer system and are transmitted for processing of the other data blocks (49). A feedback module (50) connects the first step (40) with the second decision module (46). As a result, the frame burst ratio (N) can be adapted to the momentary performance of the computer system (23).

Figure 6:
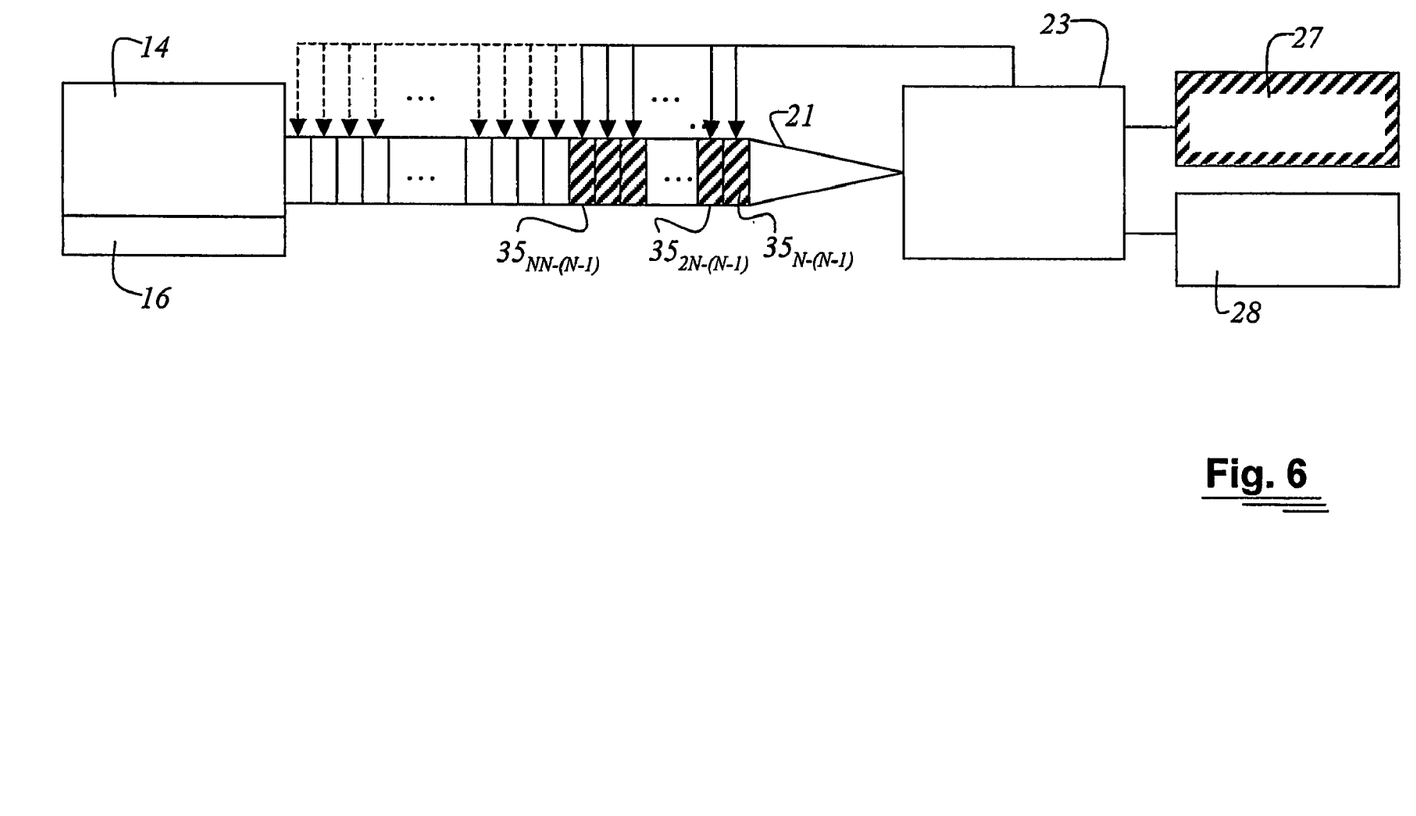
FIG. 6 a schematic diagram of the transmission of data from a real-time system to a non-real-time system, in which case the frequency of the synchronously transmitted data blocks is preselected, and the untransmitted data at the end of the scan are asynchronously transmitted to the computer system.

FIG. 6 is a schematic representation of a method for the partially synchronous transmission, analysis, and display of a scanner's acquired data. The difference between it and the depiction in FIG. 2 is that in the computer system (23) only the frames chosen by the user in accordance with the pre-specified frame burst ratio (N) are synchronously transmitted and processed. The fast scanner transmits the data in real time to its own local storage unit (16), and at the same time only the frames or data blocks, respectively that correspond to the fixed frame burst ratio specified by the user are transmitted to the computer system (23). The transmitted data blocks (frames $35_{N-(N-1)}$, $35_{2N-(N-1)}$, ..., $35_{NN-(N-1)}$) are processed immediately in the computer system (23). The frequency of the data blocks that are processed in the computer system (23) is constant. The data blocks (frames) that are processed in the computer system (23) are depicted with crosshatches in FIG. 6. It is possible for the user to specify whatever frame burst ratio (N) (or frequency) he wishes so that it takes into account the individual processing characteristics of his computer system (23). The user must specify the processing characteristics beforehand. The user inputs the frame burst ratio (N) as described in FIG. 2. The asynchronously transmitted data blocks remain in the scanner's storage (16) and are only transmitted to the computer system (23) with a delay after the end of scanning from the scanner and are therefore processed with a delay. The asynchronously transmitted data blocks are identified in FIG. 6 as empty boxes. The delayed transmission is represented by the dashed arrows on the schematically depicted data blocks. In this way, data recording by the PC that is too slow, caused by too narrow transmission bandwidth, lack of storage space, or system overload resulting from other running processes, can be avoided.

Figure 7:
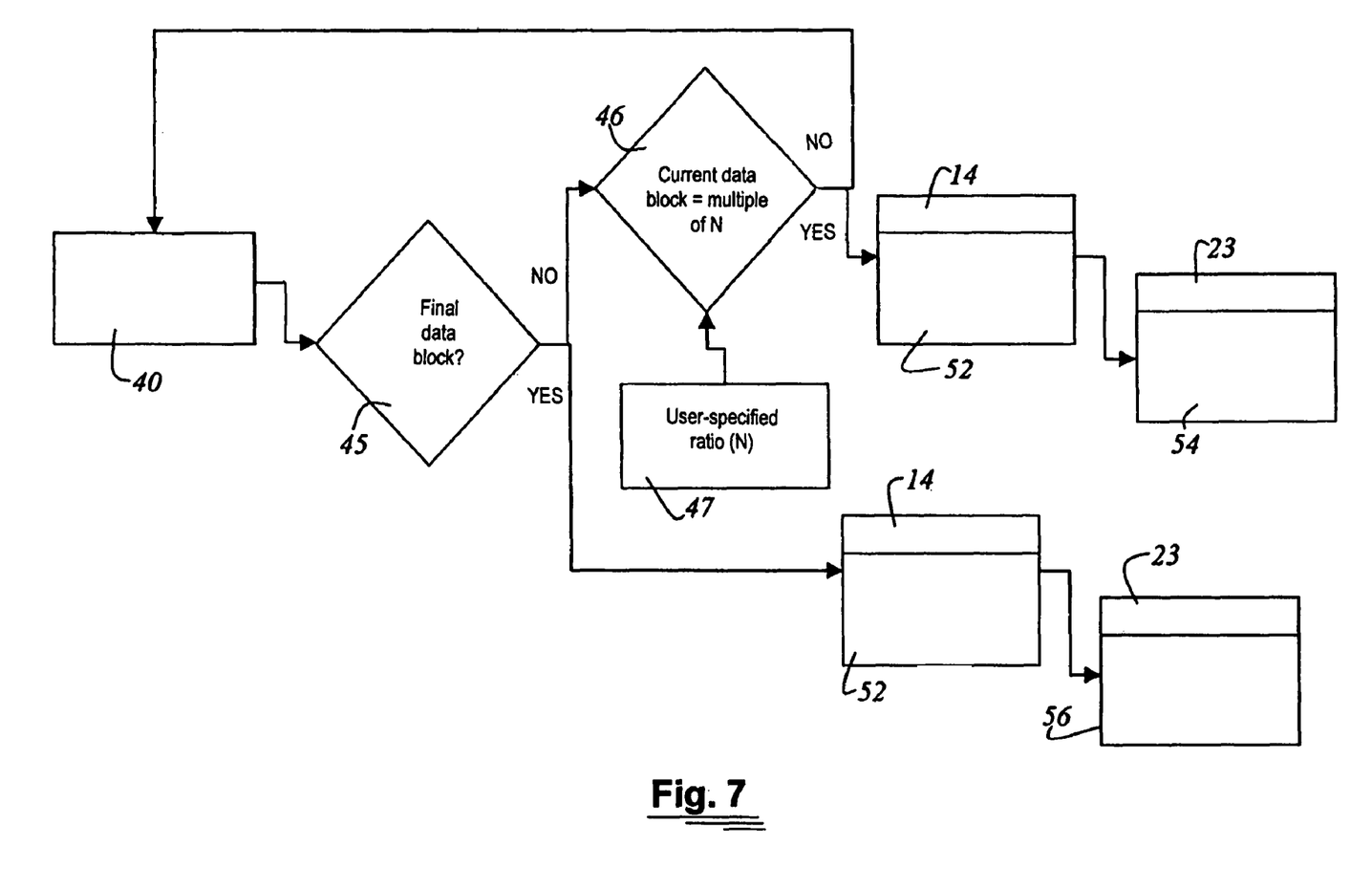
FIG. 7 a block diagram of a third embodiment of the invention, as schematically shown in FIG. 6.

A block diagram of the third embodiment of the invention as depicted schematically in FIG. 6 is shown in FIG. 7. FIG. 7 shows a block diagram that describes the third embodiment of the method according to the invention. In a first step (40) the data blocks (frames $35_{N-(N-1)}$, $35_{2N-(N-1)}$, ..., $35_{NN-(N-1)}$) that were specified by the user according to the frame burst ratio (N) are transmitted to the internal storage unit of the computer system (23) and immediately processed in the computer system (23). A first decision module (45) tests whether this was the final data block in accordance with the constant frame burst ratio. If the result in this decision module (45) is NO, the process is continued in a second decision module (46). Here, the current data block is tested to determine whether it is a multiple of N. If YES, the data block is transmitted (52) to the computer system (23) and processed (54) in the computer system (23). If the result in the second decision module (46) was NO, the process loops back, the second step (44) is redone, and a corresponding data block is retrieved from the storage unit and transmitted to the computer system (23). If the result was YES in the first decision module (45), the rest of the data blocks that have not yet been transmitted to the computer system are sent directly from the fast scanner to the computer system (23). Delayed processing (56) of the rest of the data blocks that do not correspond to the frame burst ratio (N) then occurs in the computer system (23).

Figure 8:
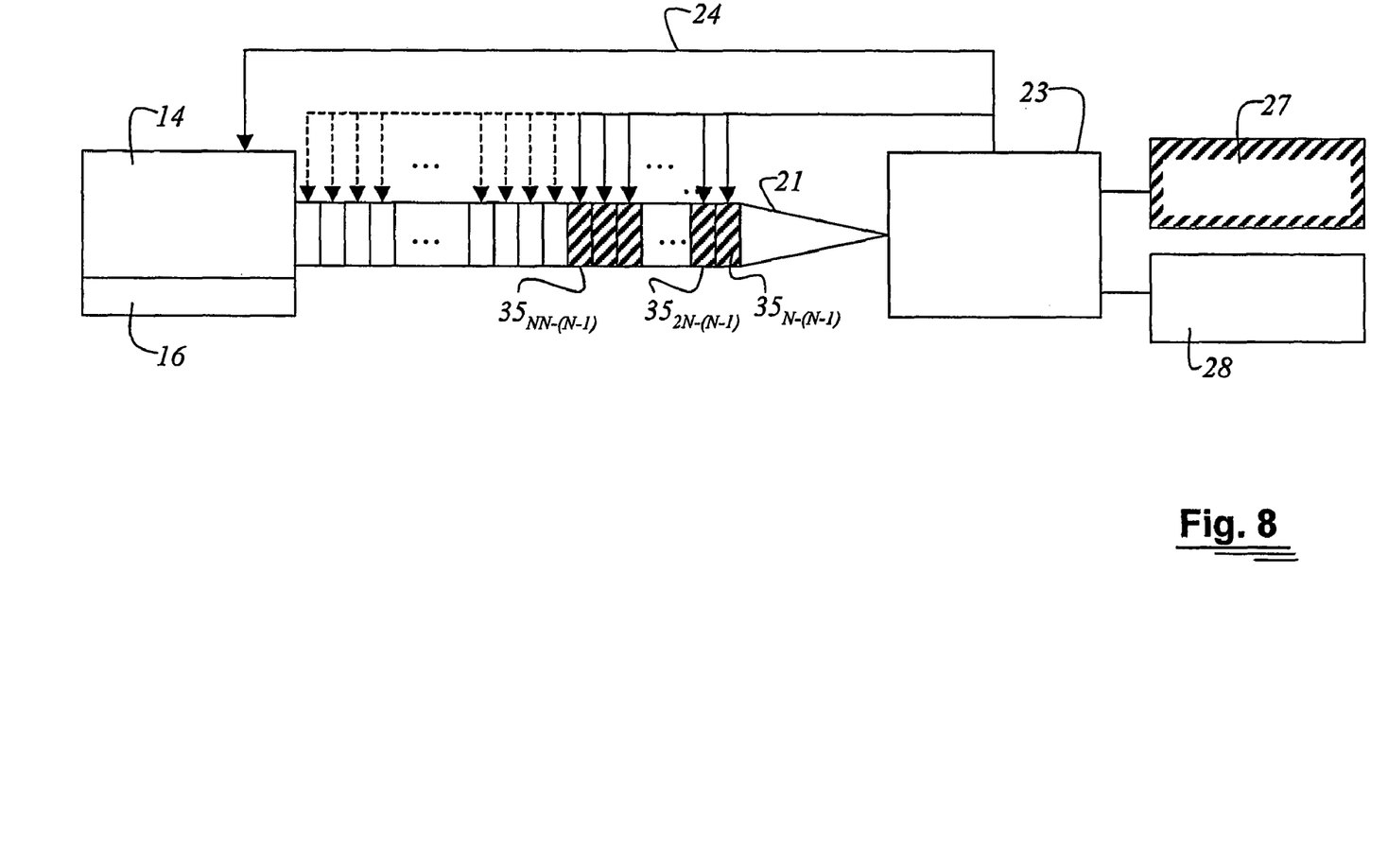
FIG. 8 a schematic diagram of the transmission of data from a real-time system to a non-real-time system, in which case the frequency of the synchronously transmitted data blocks is adapted to the computer system, and the untransmitted data at the end of the scan are asynchronously transmitted to the computer system.

FIG. 8 shows a schematic representation of a method that is very similar to the method in FIG. 6. The method shown in FIG. 8 differs to the extent that here there is no fixed frame burst ratio (N), but rather a frame burst ratio that adapts to the current performance characteristics of the computer system (23). First of all, a frame burst ratio (N) can be specified by the user. The fast scanner transmits the data in real time to its own local storage unit (16), while at the same time only the frames or data blocks that correspond to the fixed frame burst ratio (N) specified by the user are transmitted to the computer system (23). The transmitted data blocks (frames $35_{N-(N-1)}$, $35_{2N-(N-1)}$, ..., $35_{NN-(N-1)}$) are processed immediately in the computer system (23). An adaptive control is envisioned that makes the frame burst ratio (N) variable. This means that the frequency of the processed data blocks or of the on/off ratio, respectively, change and adapt to the current performance of the computer system (23). To this end, a feedback system (24) to monitor the delay or acceleration by the computer system (23) in comparison to the fast scanner is envisioned between the fast scanner and the computer system (23) and readjusts it as needed. This changes the frequency of the synchronously transmitted and processed data blocks (frames $35_{N-(N-1)}$, $35_{2N-(N-1)}$, ..., $35_{NN-(N-1)}$).

Figure 9:
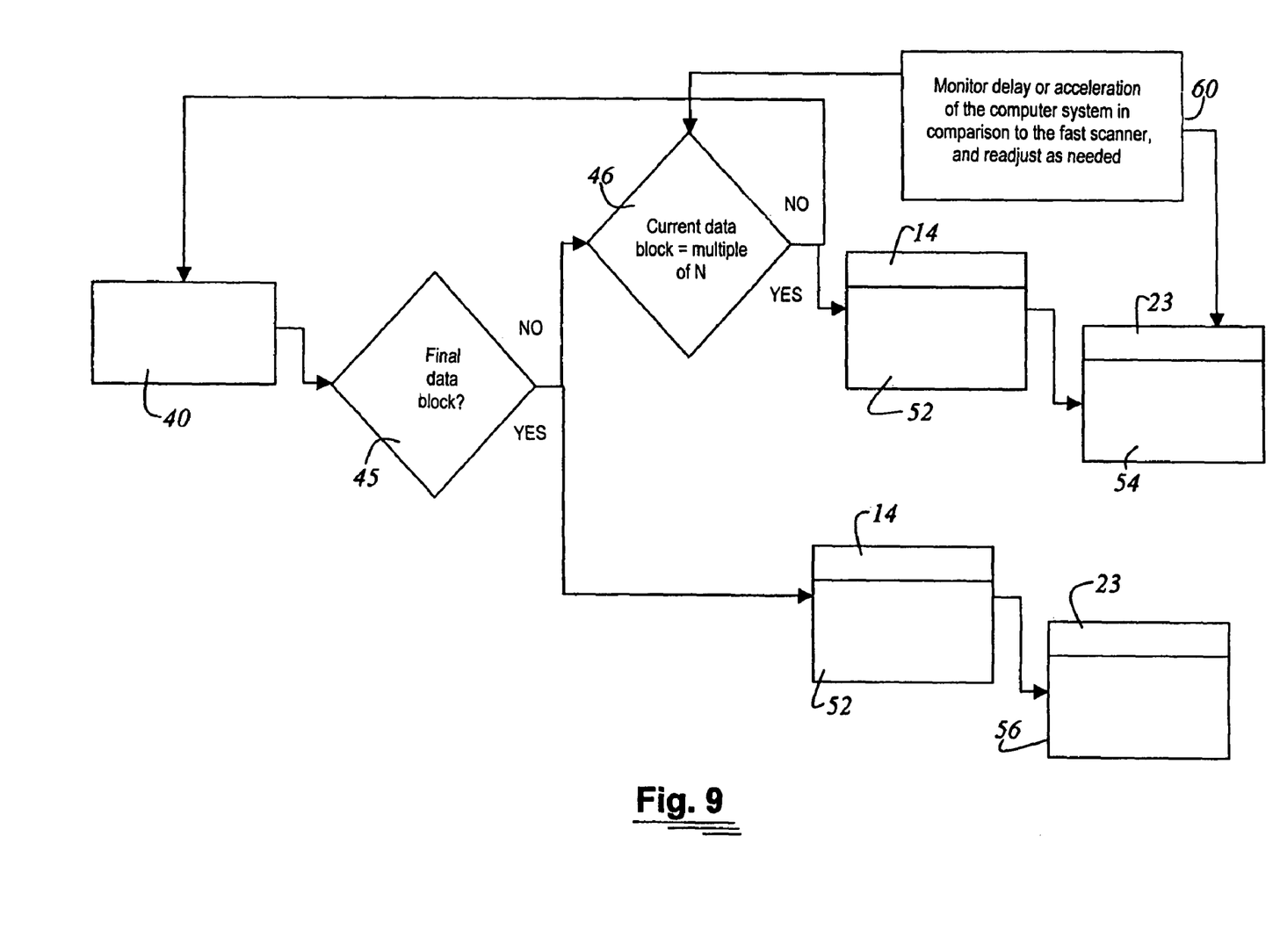
FIG. 9 a block diagram of a fourth embodiment of the invention, as schematically shown in FIG. 8.

A block diagram of the fourth embodiment of the invention as schematically depicted in FIG. 8 is shown in FIG. 9. FIG. 9 shows a block diagram that describes the fourth embodiment of the method according to the invention. In a first step (40), the data blocks (frames $35_{N-(N-1)}$, $35_{2N-(N-1)}$, ..., $35_{NN-(N-1)}$) that were specified by the user in accordance with the frame burst ratio (N) are transmitted to the internal storage unit in the computer system (23) and immediately processed in the computer system (23). A first decision module (45) tests whether this was the final data block in accordance with the adaptable frame burst ratio. If the result in this decision module (45) is NO, the process is continued in a second decision module (46). Here, the current data block is tested to determine whether it is a multiple of N. If YES, the data block is transmitted (52) to the computer system (23) and then stored and processed (54) in the computer system (23). A feedback module (60) is connected to the computer system (23) in which the storage and processing (54) of the data block takes place.

If the result in the second decision module (46) was NO, the process loops back, the second step (44) is redone, and a corresponding data block is retrieved from the storage unit and transmitted to the computer system (23). If the result was YES in the first decision module (45), the rest of the data blocks that have not yet been transmitted to the computer system are sent directly to the computer system (23). Asynchronous processing (56) of the rest of the data blocks that do not correspond to the frame burst ratio (N) then occurs in the computer system (23). In this way, the frame burst ratio (N) can be adapted to the current performance of the computer system (23). As a result, data recording by the computer system (23) that is too slow, caused by a too narrow transmission bandwidth, lack of storage space, or system overload resulting from other running processes, can be avoided.

In both the second and the fourth embodiment of the invention, the frame burst ratio (N) is adapted to the conditions of the computer system (23). In addition to the provision for the user to specify an initial value, the computer system (23) itself can specify an initial value for the frame burst ratio (N). It is selected automatically during the data acquisition cycle by means of a suitable algorithm, depending on the set scan speed and whatever processing routines are running in the computer system (23). The computer system (23) constantly monitors the difference between the data blocks acquired by the scanner and the number of data blocks actually processed by the computer system (23). The difference between the acquired and the processed data blocks is determined, and appropriate action is initiated. Optimally, the difference should be 0 in a computer system running at full load. Adaptive control aims at maintaining his condition.

If the difference increases, the computer system (23) is not capable of meeting the required frame burst ratio (N). The frame burst ratio (N) is increased. If the difference is not zero (0) and the computer system (23) is not operating at full load, the computer system (23) is able to meet the required frame burst ratio (N) beyond the extent required. In this case, frame burst ratio (N) will decrease.

All obtained values for the frame burst ratio (N) of the data acquisition cycle are summarized using a suitable algorithm into an empirical value in the computer system (e.g., a mean or average value, in the simplest case). This empirical value is stored in the computer system so that it is available to specify a more optimal initial value for later comparable data acquisition cycles.

The following example is meant to illustrate the adaptive control of the frame burst ratio (N) in a data acquisition cycle. To start with, the frame burst ratio (N) is preset to 10. The difference increases to 50, and the frame burst ratio (N) is increased to 20. During the subsequent data acquisition cycle, the difference falls to 0, and when the computer system (23) is running at full load, the frame burst ratio (N) is set at 20. The user changes the scan parameters during data acquisition. The difference increases to 100. As a consequence, the frame burst ratio (N) is increased to 30. The scan parameters are changed, and the difference falls below zero when the computer system (23) is not running at full load. As a consequence, the frame burst ratio (N) is decreased to 20. The computer system (23) is disturbed by an external process. As a result, the difference again increases to 50. The frame burst ratio (N) is then increased to 25. These changes in the frame burst ratio (N) continue during the entire data acquisition cycle.

The invention claimed is:

1. A data processing method in a scanning microscope with a fast scanner, comprising:

acquisition of data blocks in real-time with a fast scanner;

transmission of the data blocks to a computer system; and the computer system processing of selected data blocks before other data blocks, wherein the sequence in which the computer system processes the acquired data blocks depends on a frame burst ratio and wherein the frame burst ratio is selected for optimal performance of the computer system.

2. The method according to claim 1, wherein the frame burst ratio is selected by a user as a function of the processing characteristics of the computer system.

3. The method according to claim 2, wherein all data blocks are stored in the computer system before processing of the selected data blocks.

4. The method according to claim 1, wherein adaptive control makes the frame burst ratio variable.

5. The method according to claim 4, wherein an initial value is specified for the frame burst ratio at the start of data acquisition.

6. The method according to claim 5, wherein all data blocks are stored in the computer system before processing of the selected data blocks.

7. The method according to claim 1, wherein the selected data blocks are transmitted to the computer system before the other data blocks.

8. The method according to claim 7, wherein the other data blocks are transmitted to the computer system and processed after the selected data blocks.

9. The method according to claim 1, wherein the frame burst ratio is adapted by the computer system during acquisition of the data blocks; and in that at the same time only selected data blocks are transmitted to the computer system.

10. The method according to claim 9, wherein the other data blocks are transmitted and/or processed to the computer system after the selected data blocks.

* * * * *